United States Patent [19]

Gomi et al.

[11] Patent Number: 5,541,265
[45] Date of Patent: Jul. 30, 1996

[54] COATING MATERIAL COMPOSITION

[75] Inventors: Tadashi Gomi, Fussa; Atsushi Wada, Fuchu, both of Japan

[73] Assignee: Yuho Chemicals, Inc., Tokyo, Japan

[21] Appl. No.: 244,621

[22] PCT Filed: Sep. 30, 1992

[86] PCT No.: PCT/JP92/01251

§ 371 Date: Jun. 2, 1994

§ 102(e) Date: Jun. 2, 1994

[87] PCT Pub. No.: WO94/07959

PCT Pub. Date: Apr. 14, 1994

[51] Int. Cl.$^6$ ................................................. C08F 236/00
[52] U.S. Cl. ..................... 525/366; 525/368; 525/369; 525/329.3; 525/329.7; 525/330.2
[58] Field of Search ..................... 525/366, 368, 525/369, 329.3, 329.7, 330.2

[56] References Cited

U.S. PATENT DOCUMENTS

| | | | |
|---|---|---|---|
| 2,754,280 | 7/1956 | Brown et al. | 528/366 |
| 2,795,564 | 6/1957 | Conn et al. | |
| 4,017,662 | 4/1977 | Gehman et al. | |
| 4,563,289 | 1/1986 | Thompson. | |
| 4,702,944 | 10/1987 | Thompson. | |
| 4,918,147 | 4/1990 | Yamamori et al. | |
| 5,077,320 | 12/1991 | Touda et al. | |
| 5,149,745 | 9/1992 | Owens et al. | 525/366 |
| 5,241,011 | 8/1993 | Landscheidt et al. | |
| 5,292,794 | 3/1994 | Maginnis | 528/368 |
| 5,297,740 | 3/1994 | Landscheidt et al. | |
| 5,319,018 | 6/1994 | Owens et al. | |

FOREIGN PATENT DOCUMENTS

| | | |
|---|---|---|
| 47-14019 | 4/1972 | Japan. |
| 47-15597 | 5/1972 | Japan. |
| 50-112428 | 9/1975 | Japan. |
| 57-117552 | 7/1982 | Japan. |
| 63-258969 | 10/1988 | Japan. |
| 2-151669 | 6/1990 | Japan. |
| 2-219863 | 9/1990 | Japan. |
| 1072045 | 11/1963 | United Kingdom. |
| 1072044 | 11/1963 | United Kingdom. |

*Primary Examiner*—Jeffrey T. Smith
*Attorney, Agent, or Firm*—Brinks Hofer Gilson & Lione

[57] ABSTRACT

A process for preparing a coating composition characterized in that the process comprises the step of reacting 0.05 to 0.9 chemical equivalents of a calcium compound based on an acid value of a polymer with a polymer emulsion containing the polymer having the acid value of 20 to 200 prepared by a polymerization of unsaturated ethylenic monomers is provided. Calcium oxide, calcium hydroxide, calcium carbonate and the like may be used as the calcium compound, and the reaction of the calcium compound with the polymer may be carried out after the pH of the emulsion is adjusted within a range of from 4.5 to 9 by adding a base. The coating compositions of the present invention are stable for long period of time and free from environmental pollution since they contain no heavy metal. They are characterized to not generate uncomfortable odor of ammonia during application and drying-up since no metal complex is used.

8 Claims, No Drawings

5,541,265

COATING MATERIAL COMPOSITION

TECHNICAL FIELD

The present invention relates to coating material compositions. More specifically, it relates to stable coating compositions capable of forming tough coating films which exhibiting good gloss when applied to surfaces of floors.

BACKGROUND ART

Coating compositions applied to floors such as made of wood, concrete, vinyl tiles, rubber tiles require good workabilities upon their applications. Furthermore, films formed after dryness also require to have good gloss, to be hardly stained with black heel marks by shoes, and to have good durability. In addition to these properties, they also require detergent resistance to the extent that the gloss of the films is maintained by ordinary cleanings by using detergents, and removability so that they can easily be removed by chemical processes, not by physical removals, when heavily stained or damaged. Since the durability of the films and the removability of the films are properties inconsistent with each other, attempts have been made to achieve both of the properties so as to form films having excellent removability and durability.

For that purpose, coating compositions comprising an emulsified copolymer added with a polyvalent metal complex have been proposed (Japanese Patent Unexamined Publication No. (Sho)47-14019/1972). However, when the compositions containing a polyvalent metal complex are applied and dried, they have problems to generate an odor of amines or ammonia by vaporization of amines or ammonia contained as ligands in the complex upon the decomposition of the complex. The polyvalent metal complexes used for these coating compositions are complexes of heavy metal such as zinc, cobalt, cadmium, nickel, chromium, zirconium, tin, tungsten and aluminum. They are undesirable from the view point of environmental pollution. As a method for preventing the odor of amine after applications of coating compositions, a process has been proposed in which zinc oxide is dispersed in a polymer emulsion (Japanese Patent Unexamined Publication No. (Sho) 57-117552/1982). This method is characterized by comprising a step of dispersing zinc oxide in an emulsion containing an acrylic copolymer by, for example, agitation, by which the resulting coating compositions are stable and free-from the odor of amine upon dryness. However, since zinc used in the composition is a heavy metal, they are undesirable from the viewpoint of environmental hygiene. In addition, since zinc oxide is extremely insoluble in water, zinc oxide can hardly be transferred into polymer oil particles in the emulsion. Zinc oxide sometimes precipitates where the emulsion is left stand for a prolonged period of time.

In order to solve the latter problem, compositions have also been proposed which are obtained by reacting a transition metal with a polymer at a certain temperature (Japanese Patent Unexamined Publication No.(Hei)2-219863/1990). However, metals used in the composition are heavy metals such as zinc, which are undesirable from the standpoint of environmental pollution. Japanese Patent Unexamined Publication No.(Hei)2-219863/1990 also discloses that metals other than heavy metals, e.g., a divalent alkali earth metal, are unsuitable where they are used as crosslinking agents. Furthermore, Japanese Patent Publication No.(Sho)47-15597/1972 discloses aqueous polishing compositions containing calcium chloride or calcium acetate as a divalent calcium salt. It also discloses that these calcium compounds are used in an amount sufficient to ionically crosslink to carboxyl groups contained in the dried compositions. However, this publication merely teaches that calcium compounds are added for modifications before an application of the composition, and it does not disclose that calcium compounds react with the carboxyl groups of the polymer in oil particles of the emulsion.

Accordingly, an object of the invention is to provide stable coating compositions which do not contain any heavy metal and can form tough films without generating an odor of amine or ammonia when they are applied and dried.

DISCLOSURE OF THE INVENTION

The inventors conducted various studies in order to achieve the foregoing object and found that a tough resin film can be obtained by using calcium, a divalent metal, as a crosslinking agent for the polymer. More specifically, it was found that a stable coating composition capable of forming a tough film after application and dryness can be obtained by directly reacting carcium compounds with a polymer under heating or non-heating to allow calcium compounds react in a polymer emulsion. Furthermore, it was also found that calcium compounds more efficiently react with the polymer by adjusting a pH of the polymer emulsion using a base. The method of the present invention was achieved on the basis of the aforementioned findings.

The present invention thus provides a process characterized in that it comprises a step of reacting a calcium compound in an amount of 0.05 to 0.9 chemical equivalents based on an acid value of a polymer with a polymer emulsion containing the polymer having the acid value of 20 to 200 prepared by a polymerization of unsaturated ethylenic monomers.

According to another embodiment of the present invention, there is provided a process characterized in that it comprises a step of reacting under heating a calcium compound in an amount of 0.05 to 0.9 chemical equivalents based on an acid value of a polymer with a polymer emulsion containing the polymer having the acid value of 20 to 200 prepared by a polymerization of unsaturated ethylenic monomers.

According to still further embodiment of the present invention, there is provided a process for preparing a coating composition characterized in that it comprises the steps of adding a base to a polymer emulsion containing a polymer having an acid value of 20 to 200 prepared by a polymerization of unsaturated ethylenic monomers to adjust a pH of the emulsion to 4.5 to 9, and then reacting with the emulsion a calcium compound in an amount of 0.05 to 0.9 chemical equivalents based on the acid value of the polymer.

Best Mode for Carrying Out the Invention

The polymers used in the present invention are those prepared by a polymerization of unsaturated ethylenic monomers. Any polymers described above can be used, so far that they are soluble or dispersible in water and that they have acid functional groups with an acid value of from 20 to 200. In general, a polymer prepared by using 3 to 20% by weight of unsaturated ethylenic monomers, e.g., acidic monomers such as acrylic acid, methacrylic acid, maleic acid, itaconic acid, maleic anhydride, and vinyl phenol based on the total monomers. Monomers which are used in addition to the aforementioned monomers may be chosen by those skilled in the art so as to achieve various sorts of properties depending on the use of the composition. For example, polymerizable comonomers which are capable of forming a flexible polymer or a rigid polymer in the presence of a radical catalyst can be used.

Examples of the comonomers which can provide a flexible polymer after a polymerization include primary alkyl acrylates, secondary alkyl acrylates, primary alkyl methacrylates, secondary alkyl methacrylates and vinyl esters of saturated monocarboxylic acids. Preferred examples of the unsaturated ethylenical compounds include acrylates, itaconates and methacrylates, and preferred examples of the esters include those esters having an alkyl group having equal to or less than eight carbon atoms.

An example of the monomers which can provide a flexible polymer is a monomer represented by the following formula: $H_2C=C(R^1)-COOR^2$ wherein $R^1$ represents a hydrogen atom or a methyl group with a proviso that $R^2$ represents a primary or secondary alkyl group having 5 to 18 carbon atoms when $R^1$ is a methyl group and $R^2$ represents an alkyl group having equal to or less than 18, preferably 2 to 8, more preferably 2 to 4 carbon atoms when $R^1$ is a hydrogen atom. More specifically, examples of the monomers include monomers such as ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylhexyl methacrylate, 2-ethylbutyl methacrylate, octyl methacrylate, 3,5,5-trimethylhexyl methacrylate, decyl methacrylate, dodecyl methacrylate, and octadecyl methacrylate, or monomers having an substituted alkyl group such as butoxyethyl acrylate and butoxyethyl methacrylate. In addition, examples of the monomers which can provide a flexible polymer include ethylene, propylene, butadiene, chloroprene, isobutene, and isoprene.

Examples of the polymerizable unsaturated ethylenical monomers which can provide a rigid polymer after a polymerization include alkyl methacrylates having an alkyl group with up to 4 carbon atoms, alkyl acrylates having an alkyl group with up to 2 carbon atoms, tert-amyl methacrylate, tert-butyl or tert-amyl acrylate, cyclohexyl, benzyl or isobornyl acrylates or methacrylates, acrylonitrile, methacrylonitrile e, styrene, vinyl chloride, chlorostyrene, vinyl acetate and alpha-methylstyrene.

More specifically, a monomer represented by the following formula: $H_2C=C(R^3)-X$ wherein $R^3$ represents a hydrogen atom or a methyl group and X represents nitrile, phenyl, methylphenyl or an ester-forming group, or $-COOR^4$ ($R^4$ represents cyclohexyl, methyl, ethyl or a tert-alkyl group having 4 to 5 carbon atoms), or alternatively, an alkyl group having 2 to 4 carbon atoms when $R^3$ is methyl. Further specific examples include methyl methacrylate, ethyl methacrylate, propyl methacrylate, isopropyl methacrylate, isobutyl methacrylate, n-butyl methacrylate, sec-butyl methacrylate, and tertbutyl methacrylate. Acrylamide and methacrylamide are also useful.

Examples of polymers used in the present invention other than those mentioned above, polymers of vinyl alcohol esters such as vinyl formate, vinyl acetate, vinyl propionate, vinyl butylate or vinyl benzylate can be used. Examples of such polymers include poly(vinyl acetate) and copolymers formed by vinyl acetate with vinyl chloride, vinylidene chloride, styrene, vinyl toluene, acrylonitrile, methacrylonitrile, acrylate, methacrylate esters or the like.

These polymers can be prepared as block copolymers, random copolymers, graft copolymers or core-shell type polymers by an emulsion polymerization or a solution polymerization in the presence of water or an organic solvent. For example, the monomers can be emulsified for the emulsion polymerization in accordance with methods described in U.S. Pat. Nos. 2,754,280 and 2,795,564. As emulsifying agents, anionic, cationic, or nonionic emulsifying agents may be used. Preferably, anionic or nonionic emulsifying agents may be used. For example, alkali metal salts, ammonium salts, or amine salts of alkylsulfonates, aryl-sulfonates, alkylarylsulfonates, alkylsulfates, arylsulfates and alkylarylsulfates may be used. These emulsifying agents can be used in an amount of from 0.5 to 10% by weight based on the total amount of monomers. Where radical initiators such as ammonium persulfate or potassium persulfate are used as polymerization initiators, such polymerization initiators can be used alone or in combination with accelerators such as potassium disulfite and sodium thiosulfate. In general, the initiators and the accelerators can be used in an amount of from 0.1 to 5.0% by weight based on the total amount of the monomers. Furthermore, chain transfer agents including mercaptans, polymercaptans, or polyhalogenated compounds may be used. Usually, the chain transfer agents can be used in an amount of from 0.01 to 1.0% by weight based on the total amount of the monomers.

The polymers suitably used in the present invention are copolymers having an acid value of 20 to 200, preferably 30 to 80. These polymers can be prepared in the manner as described above as emulsions in water generally so as to have a pH of from 2 to 5. A polymer emulsion comprising a mixture of two or more polymers prepared separately may be used. Where two or more polymers are used, polymers of any acid values may be used in combination so far that acid values of polymer mixtures in a form of combination fall within the range described above. For such purpose, a polymer having an acid value of less than 20 may be combined with a polymer having an acid value of more than 200.

According to one embodiment of the present invention, there is provided a process comprising a step of adding and reacting 0.05 to 0.9 chemical equivalents of a calcium compound based on the acid value of the polymer with the above-described polymer emulsion. Examples of the calcium compound include calcium oxide, calcium hydroxide, calcium carbonate, calcium acetate, calcium chloride, and a mixture thereof. However, they are not limited to these compounds. Among these calcium compounds, calcium oxide, calcium hydroxide, and calcium carbonate are preferably used. In addition, these calcium compounds may be used in combination with one or more calcium complex compounds such as calcium glycine ammonia, calcium malate ammonia and calcium carbonate ammonia. Furthermore, they may be used together with a small amount of metal compounds or metal complex compounds of zinc, cobalt, cadmium, nickel, chromium, zirconium, tin, tungsten, aluminum or the like. Commercially available calcium compound in a form of powder may be used as the aforementioned calcium compound. Preferably, calcium compound of fine grade having a particle size of 0.2 to 0.5 microns can be used.

The polymer suitably used in the above-described embodiment of the present invention may be, for example, an acrylic/styrene copolymer. An example of aqueous emulsions of the acrylic/styrene copolymer prepared by emulsion copolymerizations is an emulsion prepared by an emulsion polymerization wherein (a) 5 to 15% by weight of α, β-unsaturated carboxylic acid, (b) 20 to 40% by weight of methyl methacrylate, (c) 20 to 40% by weight of alkyl acrylate having an alkyl group of 2 to 8 carbon atoms and (d) 5 to 30% by weight of styrene are used as monomer components and they are added with an emulsifying agent and a polymerization initiator well known to those skilled in the art.

The above-described calcium compound may be used in an amount of 0.05 to 0.9, preferably 0.3 to 0.6 chemical equivalents based on the acid value of the polymer for the reaction with the polymer. While it is not intended to be bound by any theory, according to the method of the present invention, the calcium compound is taken into the polymer oil particles and then the reaction of the calcium compound and the polymer proceeds in the polymer oil particles. If the content of calcium ion is below the above-described range, the toughness of the resulting film may be lowered. If the content of the calcium compound is above the aforementioned range, problems may arise in product stability and leveling properties, which is not preferable. Examples of methods for dispersing the calcium compound in a polymer emulsion and reacting the calcium compound with the polymer include a process comprising the steps of directly adding a prescribed amount of calcium compound in a form of powder to the polymer emulsion and mixing the result with stirring, or a process comprising the steps of separately preparing an aqueous solution or dispersion of the calcium compound and adding the result to the polymer emulsion. The aqueous solution or the aqueous dispersion may be prepared by adding 10 to 50% by weight of the calcium compound to an aqueous solvent and then dissolving or dispersing the calcium compound with stirring. The stirring can be carried out by using a homomixer, kneader or the like.

The above reaction process may be carried out either at room temperature or under heating. Preferably, the reaction may be carried out by maintaining a temperature of the polymer emulsion added with the calcium compound at around the glass transition temperature (Tg) of the polymer, most preferably at a temperature above the Tg. Preferred embodiments where the reaction is carried out under heating include a process comprising the step of carrying out the reaction at a temperature of about 5 to 40° C. higher, preferably 10° C. higher than the glass transition temperature (Tg) of the polymer. Where the calcium compound is used in an amount of about 0.2 to 0.5 chemical equivalents based on the acid value of the polymer, the reaction may be carried out at room temperature. Where the calcium compound is used in an amount of more than 0.5 chemical equivalents, the reaction may preferably be carried out under heating. If the reaction temperature is too low, the calcium compound can hardly be taken into the polymer particles in the emulsion, and accordingly, the carcium compound occasionally precipitates in the polymer emulsion since the reaction of the calcium compound with the polymer is insufficient. It is not preferable that the reaction temperature is higher than the decomposition temperature of the polymer emulsion since it becomes difficult to prepare the coating composition of the present invention.

The aforementioned reaction may be continued until the coating compositions in the form of uniform emulsions are obtained. More specifically, it can be continued until the calcium compound used no longer precipitates from the coating composition in the form of an emulsion. For example, it is preferable to carry out the reaction continuously so that a minimal film-forming temperature of the coating composition of the present invention is not less than 5° C., preferably not less than 10° C. above a minimal film-forming temperature of the polymer emulsion which is added with a base but free from calcium ions. In general, when 40% or more of acid functional groups in the polymer are crosslinked with calcium ions, the minimal film-forming temperature is elevated by 10° C. or more. Therefore, the reaction may be carried out using the minimal film-forming temperature as an index.

According to another embodiment of the present invention, there is provided a process for preparing coating compositions which comprises, for the reaction of the calcium compound and the polymer according to the method described above, the polymer emulsion is added with a base to adjust a pH of the emulsion within a range of 4.5 to 9 and then reacting the emulsion with a calcium compound in an amount of 0.05 to 0.9 chemical equivalents based on the acid value of the polymer. According to the present method, the reaction of the calcium compound and the polymer can more efficiently be conducted.

An example of the aqueous polymer emulsions suitably used in the aforementioned embodiments of the present invention is an aqueous acrylic copolymer emulsion. More specifically, it is preferred to use an emulsion prepared by an emulsion polymerization wherein (a) 6 to 10% by weight of α, β-unsaturated carboxylic acid, (b) 50 to 74% by weight of methyl methacrylate and (c) 20 to 40% by weight of alkyl acrylate having an alkyl group of 2 to 8 carbon atoms are used as monomer components and they are added with an emulsifying agent and a polymerization initiator well known to those skilled in the art.

According to the above-described embodiment of the present invention, after a base is added to the polymer emulsion prepared as described above to adjust a pH of the polymer emulsion so as to fall within a range of from 4.5 to 10, preferably from 6 to 9, more preferably 7.5 to 8.5, the mixture is stirred, for example, for about 30 minutes to 2 hours, and then the polymer is allowed to react with the calcium compound. Examples of the base used in the method of the present invention include ammonia and amines. More specifically, diethylaminoethanol, monoethanolamine, diethylamine and triethylamine may be used as the amine. Among these amines, diethylaminoethanol is preferably used.

Although the base may be added during the production of the polymer emulsion, i.e., during the emulsion polymerization, it may preferably be added to the polymer emulsion after the completion of the emulsion polymerization. For example, where an aqueous ammonia solution is added as the base, an aqueous ammonia solution containing not more than 10% by weight of ammonia may be used, and a total amount thereof may be added at once so that a pH of the polymer emulsion falls within the aforementioned range, or alternatively, a necessary amount may be divided into several portions to be added portionwise. Where the total amount is added at once, it is preferable that the polymer emulsion is stirred vigorously. The base may be added for 5 to 15 minutes by means of, for example, a dropwise addition. Where strongly hydrophobic polymer emulsions are used, it is preferred to adjust the pH within a range of from 8 to 9. Where strongly hydrophilic polymer emulsions are used, it is preferred to adjust the pH within a range of from the 4.5 to 8. If the pH of the polymer emulsion after being added with the base is above 10, an odor of the ammonia or the amine used as the base becomes significant, which is not preferred. Although it is not intended to be bound by any theory, by means of the agitation of the polymer emulsion for 30 minutes to 2 hours after the addition of the base, polymer oil particles in the emulsion become swelled and acid functional groups of the polymer orient on the surfaces of the micelles. These acid functional groups can easily react with the calcium compound so as to form calcium crosslinkings of the carboxylic acids of the polymer. The agitation procedure may be carried out so that a minimal film-forming temperature of the polymer emulsion after the addition of the base is at least 5°, preferably at least 10° C. lower than that of the polymer emulsion before the addition of the base.

Where the polymer emulsion is prepared so that it has a pH value of less than 6.5 by using a smaller amount of the base, it is preferred to carry out the reaction of the calcium compound and the polymer under heating. Where the polymer emulsion is prepared so that it has a pH value of above 7.5 by using a larger amount of the base, the reaction of the calcium compound and the polymer may be carried out at room temperature.

The coating composition of the present invention prepared by the method described above may contain, in addition to the aforementioned components, known ingredients which include waxes such as paraffin, montan, polyethylene waxes; alkali-soluble resins such as rosin-modified maleic acid resin and styrene/maleic acid resin; plasticizers such as dibutyl phthalate and tributoxyethyl phosphate; film-forming agents such as diethylene glycol monoethyl ether and dipropylene glycol monomethyl ether; and fluorine-containing surfactants. The wax and the alkali-soluble resin components can be used in an amount of about 5 to 70% by weight based on the polymers. These components are directly mixed with the polymer emulsion, or alternatively, they are added as aqueous dispersions alone or together with the calcium compound. The coating composition of the present invention thus prepared is preferably adjusted to have a final pH of from 6 to 9. If the pH is lower than 6, stabilities of the products and leveling properties of films formed after application tend to be lowered. If the pH of the coating composition is higher than 9, recoatability of the coating compositions are lowered and the odor of ammonia or amines upon dryness becomes strong and they are not preferred. For the adjustment of the pH of the composition at the final step, bases such as alkali metal hydroxides or acids such as carbon dioxide gas and acetic acid may be used in addition to the bases described above. These pH adjusting agents may suitably be added in a necessary amount during the reaction of the calcium compound and the polymer or after the completion of the reaction.

The coating compositions of the present invention may preferably be prepared so that a ratio of polymer content is about 3 to 40% by weight and a ratio of total resin is about 5 to 50% by weight. The coating composition of the present invention may be used by applying it to surfaces of floors made of wood, concrete, rubber tiles, vinyl tiles, linoleum tiles or the like once or repeatedly, and drying it at a temperature not lower than a minimal film-forming temperature. By the application process described above, a resin film having good gloss and durability can be obtained. Where the film formed is removed, the film can easily be removed by applying a removing agent comprising an amine, an alkali metal hydroxide, a chelating agent, a surfactant or the like which is dissolved in water onto a film surface to be removed and washing and rubbing the surface by means of an electric polisher provided with a pad or the like.

The present invention will be explained more specifically by way of examples. However, the present invention is not limited to these examples. In the following examples, the term "effective content" means a content ratio (a concentration) of each resin (unit: % by weight).

EXAMPLE 1

Preparation of Aqueous Acrylic Resins

After a reaction vessel equipped with an agitator, a reflux cooler, a dropping funnel, a thermometer and a nitrogen-inlet tube was filled with nitrogen gas, deionized water and an emulsifying agent were added and then the mixture was heated up to 60° in a water bath. A catalyst, monomers, and, if desired, a molecular weight adjusting agent (see, Table 1) were added dropwise to the vessel for 2 hours to complete the polymerization. Acrylic resin emulsions A to F having effective contents of 40% were obtained.

TABLE 1

|  | A | B | C | D | E | F |
|---|---|---|---|---|---|---|
| Methacrylic acid | 0.60 | 2.40 | 4.00 | 4.80 | 4.00 | 15.00 |
| Itaconic acid |  |  |  |  | 3.78 |  |
| Methyl methacrylate | 15.40 | 25.60 | 14.00 |  | 18.22 | 17.00 |
| Butyl acrylate | 12.00 | 12.00 | 14.00 | 16.00 | 12.00 |  |
| 2-Hydroxyethyl methacrylate |  |  |  |  |  | 8.00 |
| Glycidyl methacrylate |  |  |  |  | 2.00 |  |
| Styrene | 12.00 |  | 8.00 | 19.20 |  |  |
| Emulsifying agent (Note 1) | 0.50 | 0.50 | 0.30 |  | 0.50 | 1.00 |
| Emulsifying agent (Note 2) | 0.30 |  | 0.50 | 1.00 | 0.50 |  |
| Molecular weight adjusting agent (Note 3) |  |  |  | 0.20 |  |  |
| Deionized water | 59.20 | 59.20 | 59.20 | 58.80 | 59.00 | 59.00 |
| Acid value based on solid resin | 9.80 | 39.10 | 65.10 | 78.20 | 146.30 | 244.00 |

(Note 1) Sodium laurylsulfate
(Note 2) Polyoxyethylene lauryl ether (EO)$_3$
(Note 3) Lauryl mercaptan

EXAMPLE 2

The coating compositions according to the present invention shown in Table 2 set out below and comparative compositions shown in Table 3 were prepared.

TABLE 2

| Resin concentration | Composition of the present invention | | | | | | | | | |
|---|---|---|---|---|---|---|---|---|---|---|
|  | 15 | 15 | 15 | 15 | 15 | 15 | 15 | 15 | 15 | 15 |
| No. | 1 | 2 | 3 | 4 | 5 | 6 | 7 | 8 | 9 | 10 |
| A | 14.070 |  |  |  |  | 22.500 |  |  |  |  |
| B |  | 28.150 |  |  |  |  |  |  | 27.750 | 15.650 |
| C |  |  | 30.000 |  |  |  | 25.000 | 15.000 |  |  |
| D |  |  |  | 30.000 |  |  |  |  |  |  |

TABLE 2-continued

| | Composition of the present invention | | | | | | | | | |
|---|---|---|---|---|---|---|---|---|---|---|
| Resin concentration | 15 | 15 | 15 | 15 | 15 | 15 | 15 | 15 | 15 | 15 |
| No. | 1 | 2 | 3 | 4 | 5 | 6 | 7 | 8 | 9 | 10 |
| E | 14.080 | | | | 33.750 | | | | | |
| F | | | | | | 11.250 | | 12.500 | | |
| Base | | | | | | | | | | |
| 5% conc. Ammonia | 0.390 | 0.650 | | | 0.620 | 1.170 | 0.380 | 0.86 | 0.320 | 0.220 |
| 5% conc. Diethyl-aminoethanol | | | | 3.740 | | | | | 1.440 | |
| Calcium Compound | | | | | | | | | | |
| Calcium hydroxide | 0.116 | | | | | 0.235 | 0.172 | | 0.143 | |
| Calcium oxide | | 0.044 | | 0.094 | | | | | | 0.061 |
| Calcium carbonate | | | 0.279 | | 0.352 | 0.317 | | 0.862 | | |
| Calcium glycine ammonia (Note 4) | | | | | 5.632 | | | | | |
| Sodium hydroxide | 0.006 | | | | | | | | | |
| Alkali-soluble resin (Note 5) | 3.570 | 3.570 | 1.790 | 1.790 | | | | 2.380 | | 3.000 |
| Polyethylene wax emulsion (Note 6) | 5.630 | 5.630 | 5.630 | 5.630 | 3.750 | 3.750 | 12.500 | 7.500 | 9.750 | 18.700 |
| Ethyl carbitol | 4.000 | 4.000 | 3.000 | 4.500 | 4.000 | 4.000 | 5.300 | 4.700 | 6.000 | 4.100 |
| Tributoxyethyl phosphate | 1.000 | 0.800 | 0.500 | 1.500 | 1.000 | 1.000 | 1.300 | 1.100 | 1.600 | 0.800 |
| Fluorine-containing surfactant (Note 7) | 0.040 | 0.040 | 0.040 | 0.040 | 0.040 | 0.040 | 0.040 | 0.040 | 0.040 | 0.040 |
| Water | 57.098 | 57.116 | 58.761 | 52.706 | 50.856 | 55.738 | 55.308 | 55.058 | 52.957 | 57.429 |
| Degree of crosslinking 2(Ca/COOH × 100) (%) | 20 | 20 | 40 | 20 | 40 | 60 | 40 | 60 | 50 | 50 |
| Reaction condition* | R | R | H | R | H | H | H | H | H | H |

*R = Room temperature,
H = Under heating

TABLE 3

| | Comparative composition | | | | |
|---|---|---|---|---|---|
| Resin concentration | 15 | 15 | 15 | 15 | 15 |
| No. | 1 | 2 | 3 | 4 | 5 |
| A | 28.150 | | | | |
| B | | | | | |
| C | | 30.000 | | 25.000 | |
| D | | | | | |
| E | | | | | |
| F | | | 33.750 | | 27.750 |
| Base | | | | | |
| 5% conc. Ammonia | 0.390 | 0.830 | 0.620 | 0.380 | 0.320 |
| 5% conc. Diethyl-aminoethanol | | | | | 1.440 |
| Calcium Compound | | | | | |
| Calcium hydroxide | 0.015 | | 0.435 | 0.430 | |
| Calcium oxide | | | | | |
| Calcium carbonate | | | 0.588 | | |
| Sodium hydroxide | 0.006 | | | | |
| Alkali-soluble resin (Note 5) | 3.570 | 1.790 | | | |
| Polyethylene wax emulsion (Note 6) | 5.630 | 5.630 | 3.750 | 12.500 | 9.750 |
| Ethyl carbitol | 4.000 | 3.000 | 4.000 | 5.300 | 6.000 |
| Tributoxyethyl phosphate | 1.000 | 0.500 | 1.000 | 1.300 | 1.600 |
| Fluorine-containing surfactant (Note 7) | 0.040 | 0.040 | 0.040 | 0.040 | 0.040 |
| Water | 57.199 | 58.210 | 55.817 | 55.050 | 53.100 |
| Degree of crosslinking 2(Ca/COOH × 100) (%) | 20 | 0 | 40 | 100 | 0 |
| Reaction condition* | R | — | R | H | — |

*R = Room temperature,
H = Under heating (Note 4) The calcium glycine ammonia complex solution was prepared by adding 3.5 g of calcium oxide and 16.7 g of 28% aqueous ammonia to 70.4g of deionized water with stirring, dispersing the calcium oxide, and adding 9.4 g of glycine thereto (calcium content: 2.5%). (Note 5) Low molecular weight acrylic emulsion available from Rohm & Haas Company (Tradename: Primal B-644, effective content: 42%) (Note 6) Low molecular weight polyethylene wax (Ac-392) available from Allied Chemical Company was emulsified with a nonionic surfactant available from Toho Kagaku Kogyo Co. Ltd. (Tradename: Hightech E-4B, effective content: 40%) (Note 7) Fluorine-containing surfactant available from Dai-nippon Ink Kogyo Co. Ltd. (Tradename: Megafack F-812 ;effective content: 15%)

In the above examples, reactions under heating were carried out with stirring for 3 hours at a temperature of 10° C. higher than the Tg of each the polymer emulsion. The reactions at room temperature were carried out by reacting the polymer emulsions with the calcium compounds for 6 hours at room temperature. Composition 3 according to the present invention was prepared by the reaction of calcium compound and the polymer which was followed by the addition and mix of 5% aqueous ammonia (0.3% by weight), and then the addition and mix of the other resin components. Comparative composition 1 was prepared by using solely an acrylic emulsion having an acid value of 9.8, and Comparative composition 3 was prepared by using solely an acrylic emulsion having an acid value of 244. Comparative composition 4 was prepared by using 1.0 chemical equivalent of calcium compound based on the acid value of the polymer. Comparative compositions 2 and 5 contain no calcium compound.

Evaluation of Properties

Results of evaluations in the properties of the above compositions are shown in Tables 4 and 5 set out below.

TABLE 4

| Evaluation of properties | Composition of the present invention | | | | | | | | | |
|---|---|---|---|---|---|---|---|---|---|---|
| | 1 | 2 | 3 | 4 | 5 | 6 | 7 | 8 | 9 | 10 |
| Product stability (Note 8) | A | A | A | A | A | A | A | A | A | A |
| Leveling property (Note 9) | E | E | G | E | E | E | G | E | E | G |
| Gloss (%) (Note 10) | 60.3 | 55.5 | 65.2 | 78.1 | 54.4 | 62.8 | 58.8 | 56.0 | 55.0 | 50.8 |
| Water resistance (Note 11) | N | N | N | N | N | N | N | N | N | N |
| Detergent resistance (Note 12) | E | E | E | E | G | E | E | E | E | E |
| Removability (Note 13) | E | G | E | E | E | G | E | E | G | E |
| Recoatability (Note 14) | E | E | E | E | G | E | E | E | E | E |
| Black heel mark resistance (Note 15) | 11 | 9 | 7 | 12 | 4 | 2 | 8 | 1 | 3 | 6 |
| Abrasion resistance (Note 16) | 4.7 | 4.9 | 3.2 | 5.3 | 2.5 | 2.0 | 4.1 | 2.9 | 3.6 | 4.6 |
| Hardness of film (Note 17) | 6.3 | 6.7 | 7.9 | 6.0 | 8.3 | 8.8 | 7.0 | 8.6 | 7.5 | 6.3 |

A = Acceptable
E = Excellent, G = Good
N = No whitening phenomenon was observed.

TABLE 5

| Evaluation of properties | Comparative composition | | | | |
|---|---|---|---|---|---|
| | 1 | 2 | 3 | 4 | 5 |
| Product stability (Note 8) | Separated | A | Thickened | Gelled | A |
| Leveling property (Note 9) | B | Average | B | B | G |
| Gloss (%) (Note 10) | 52.8 | 30.4 | 46.7 | 48.1 | 26.3 |
| Water resistance (Note 11) | N | W | W | N | W |
| Detergent resistance (Note 12) | E | B | B | E | B |
| Removability (Note 13) | B | E | E | E | E |
| Recoatability (Note 14) | E | B | G | G | B |
| Black heel mark resistance (Note 15) | 13 | 14 | 5 | 10 | 15 |
| Abrasion resistance (Note 16) | 5.0 | 7.5 | 2.8 | 3.5 | 10.2 |
| Hardness of film (Note 17) | 5.9 | 4.8 | 8.0 | 8.3 | 2.1 |

A = Acceptable
E = Excellent, G = Good, B = Bad
N = No whitening phenomenon was observed,
W = Whitening phenomena were observed.

Evaluation Methods (1) Evaluations as to the items of Notes 8 to 15 were carried out in accordance with JISK3920 and Japan Floor Polish Industry Association (JFPA) Standards. Leveling property: JFPA Reference Standard (1) Gloss (%): JISK3920 (14) (Degree of gloss after three-fold application was measured (%).) Water resistance: JISK3920 (17) (Evaluation as to the presence or absence of whitening phenomena) Detergent resistance: JISK3920 (18) Removability: JISK3920 (19) Recoatability: JFPA Reference Standard (2) Black heel mark resistance: JISK3920 (15) (the amounts of black heel marks are visually observed to decide a rank.) (2) Evaluations of the items of Notes 16 and 17 were carried out as follows:

Abrasion resistance was determined by drying a test piece for 168 hours at room temperature which was obtained by five-fold application in the same working procedure as JFPA Standard 10 and measuring a degree of abrasion by means of a taper tester (friction ring: CS-17, 200 r.p.m., amount unit of abrasion: mg).

Hardness of a film was determined by drying a test piece for 168 hours at room temperature which was obtained by five-fold application in the same working procedure as JFPA Standard 10 and measuring hardness by means of a Knoop hardness meter.

Compositions 1 to 10 according to the present invention exhibited excellent properties with respect to all of the evaluation items and found to be coating compositions excel at every property that required to a floor polish. On the other hand, Comparative compositions 1 and 4, non-crosslinking type composition not containing calcium compounds, were inferior in essential properties of a floor polish such as water resistance, detergent resistance, black heel mark resistance, abrasion resistance, and hardness of coating. By using calcium acetate ammonia complex, Comparative composition 3 exhibited practically acceptable essential properties as a floor polish. However, it had problems of the odor of ammonia and lack of gloss after its application. Comparative compositions 12 and 15, crosslinked with calcium compound of 1.0 equivalent based on the acid value of the polymer, were inferior in product stability (storage stability) and leveling property.

Industrial Applicability

The coating compositions of the present invention are stable for a long period of time and free from environmental pollution since they contain no heavy metal. Furthermore, since any metal complex is used, they does not generate uncomfortable smell of ammonia when applied and dried up. Dried films formed by the coating compositions of the present invention are useful, since they are tough because of the calcium crosslinking to the polymers as major components, and they are excellent in various properties such as gloss, leveling property, and removability.

We claim:

1. A process for preparing a coating composition which comprises the step of reacting a polymer emulsion containing a polymer that has an acid value of 20 to 200 and was prepared by a polymerization of unsaturated ethylenic monomers with 0.05–0.9 chemical equivalents of a calcium compound based on the acid value of the polymer, the reaction bring conducted under heating at a temperature of or higher than the glass transition temperature of the polymer.

2. The process according to claim 1 further comprising the step of adding a base to the polymer and adjusting a pH of the emulsion within a range of from 4.5 to 9 before the reaction of the calcium compound.

3. The process according to claim 2 wherein the base is selected from the group consisting of ammonia and amines.

4. The process according to claim 2 wherein a minimal film-forming temperature of the polymer emulsion which contains the base but not the calcium compound is at least 5° C. lower than a minimal film-forming temperature of the polymer emulsion before the addition of the base.

5. The process according to claim 1 wherein the process comprising the use of a polymer mixture having an acid value of from 20 to 200 which comprises two or more polymers.

6. The process according to claim 1 wherein the calcium compound is selected from the group consisting of calcium oxide, calcium hydroxide, calcium carbonate, and mixtures thereof.

7. A coating composition that has been produced by the process of reacting a polymer emulsion containing a polymer, that was prepared by polymerization of unsaturated ethylenic monomers and has an acid value of 20 to 200 with 0.05–0.9 chemical equivalents of a calcium compound based on the acid value of the polymer, the reaction being conducted under heating at a temperature of or higher than the glass transition temperature of the polymer.

8. A coating composition that has been produced by the process of adding a base to a polymer, that was prepared by polymerization of unsaturated ethylenic monomers and has an acid value of 20 to 200, that is contained in a polymer emulsion, adjusting the pH of the emulsion within a range of from 4.5 to 9, and then reacting under heating the pH adjusted emulsion with 0.05 to 0.9 chemical equivalents of a calcium compound based on an acid value of the polymer at a temperature of or higher than the glass transition temperature of the polymer.

* * * * *

UNITED STATES PATENT AND TRADEMARK OFFICE
CERTIFICATE OF CORRECTION

PATENT NO. : 5,541,265
DATED : July 30, 1996
INVENTOR(S) : Tadashi Gomi et al.

It is certified that error appears in the above-indentified patent and that said Letters Patent is hereby corrected as shown below:

On the Title Page

In column 1, after "Assignee:" delete "Yuho Chemicals, Inc.," and substitute --Yuho Chemicals Inc.,--.

In the Claims

In claim 1, line 7, delete "bring" and substitute --being--.

In claim 7, line 3, after "polymer", delete --,--.

Signed and Sealed this

Nineteenth Day of August, 1997

Attest:

BRUCE LEHMAN

Attesting Officer

Commissioner of Patents and Trademarks